US006658620B1

(12) United States Patent
Berger et al.

(10) Patent No.: US 6,658,620 B1
(45) Date of Patent: Dec. 2, 2003

(54) BURST AND PACKET WIRELESS TRANSMISSION USING PRODUCT CODES WITH ITERATIVE DECODING

(75) Inventors: Harvey L. Berger, Redondo Beach, CA (US); Oliver W. Saunders, Los Angeles, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 09/481,082

(22) Filed: Jan. 11, 2000

(51) Int. Cl.[7] ............... H03M 13/00; H04L 27/00; H04L 12/28; H04J 3/04
(52) U.S. Cl. ............... 714/755; 375/259; 375/265; 370/389; 370/395; 370/535
(58) Field of Search ............... 714/755, 746, 714/314, 201, 752, 758; 375/259, 265; 348/426; 370/310.2, 389, 395, 468, 535

(56) References Cited

U.S. PATENT DOCUMENTS

| | | | |
|---|---|---|---|
| 4,675,863 A | | 6/1987 | Paneth et al. |
| 5,663,962 A | * | 9/1997 | Caire et al. ............... 370/535 |
| 5,767,912 A | * | 6/1998 | Bunting et al. ......... 375/240.01 |
| 5,898,708 A | * | 4/1999 | Tateishi et al. ............... 714/752 |
| 5,930,251 A | * | 7/1999 | Murakami et al. ..... 370/395.65 |
| 5,943,344 A | * | 8/1999 | Keller et al. ............... 370/468 |
| 6,052,370 A | * | 4/2000 | Ogura ............... 370/389 |
| 6,118,825 A | * | 9/2000 | Ikeda et al. ............... 375/259 |
| 6,198,775 B1 | * | 3/2001 | Khayrallah et al. ........ 375/265 |
| 6,356,537 B1 | * | 3/2002 | Jaakkola et al. ......... 370/310.2 |
| 6,430,722 B1 | * | 8/2002 | Eroz et al. ............... 714/755 |
| 6,519,732 B1 | * | 2/2003 | Li ............... 714/755 |

FOREIGN PATENT DOCUMENTS

| | | |
|---|---|---|
| JP | 8-714028 | 8/1996 |
| JP | 11-145969 | 5/1999 |

OTHER PUBLICATIONS

Text pages: Error Control Coding—Fundamentals and Applications, pp. 274–278, Shu Lin and Daniel J. Costello, Jr., Prentice Hall, Inc., 1982.

* cited by examiner

*Primary Examiner*—Stephen M. Baker
*Assistant Examiner*—Anthony T. Whittington
(74) *Attorney, Agent, or Firm*—McAndrews, Held & Malloy, Ltd.

(57) ABSTRACT

A communication subsystem (300) for transmitting error correction coded data in packets (200) includes an input buffer (302) storing unencoded data, a product coder (304) coupled to the input buffer, and a time division transmitter (306). The product coder (304) outputs product coded data packets (200) having a packet size, and the time division transmitter (306) transmits the product coded data packets (200) in a data section (109) of a frame (104). The data section (109) has a length substantially equal to an integer multiple of the packet size. The communication subsystem (300) may use a (s, t)×(n, m) product code specifically adapted to product code 53 byte ATM cells. A method for communicating error correction coded data in packets includes storing unencoded data in an input buffer (402), product coding the unencoded data (404), and outputting product coded data packets (406) having a packet size. The method also includes time division transmitting (408) the coded data packets in a data section (109) of a frame (104) where the data section length is substantially equal to an integer multiple of the packet size.

20 Claims, 3 Drawing Sheets

BURST AND PACKET WIRELESS TRANSMISSION USING PRODUCT CODES WITH ITERATIVE DECODING

BACKGROUND OF THE INVENTION

The present invention relates to error detection and correction coding for communication systems. In particular, the present invention relates to packet and burst data transmission using product codes and iterative decoding.

There is a continuing need for more efficient use of wireless digital transmission channels. With increased efficiency come many benefits, including increased overall data throughput, greater flexibility in service level options, and increased revenues. Within the constraints of available bandwidth and transmit power, the goal is generally to maximize the amount of data transported at a specified quality of service. The quality of service maybe expressed, for example, as a desired bit error rate (BER) or cell loss rate (in an Asynchronous Transfer Mode (ATM) system).

While continual improvement in quality of service is the topic of much research in the field, Shannon's channel capacity theorem imposes a theoretical limit on the BER performance of any code. The use of modern error detection and correction coding techniques has already dramatically increased digital transmission efficiency, however, established techniques do not yet approach the theoretical limits. Furthermore, the signal structure of modern communications systems complicates the search for the "most efficient" coding technique.

In part, complications arise due to the burst or packet nature of modern communication systems. As an example, in Time Division Multiplexed (TDM) and Time Division Multiple Access (TDMA) communications systems, each terminal transmits signals in the same frequency spectrum but in different time slots or frames so that the transmissions arrive in a preselected order at a receiver with no overlap. Each terminal, of course, generates data independently and at different times than the other terminals. Each frame gives rise to a potential discontinuity in the data stream decoded at the receiver.

The most powerful conventional coding technique, concatenating coding, suffers from a reduction in efficiency in the form of overhead needed to accommodate packet oriented transmissions. Efficiency loss occurs in part because the current forms of concatenated codes were intended for continuous transmission. In particular, a concatenated code typically uses a convolutional code as the inner code of the concatenated code. The discontinuous nature of the data stream at the decoder causes premature termination of the decoding process. The convolutional decoder at the receiver, for proper operation, therefore requires the transmitted frames to contain overhead (i.e., non information, non parity) "flush bits" that reset the decoder at the end of the frame in preparation for decoding data in the next periodic frame.

TDM systems will remain extremely popular for the foreseeable future. As it stands, many cellular telephone systems operate in a TDM/TDMA fashion. In addition, most satellite communications systems incorporate a TDMA/Frequency Division Multiplexed (FDM) uplink, and a TDM downlink. With the well entrenched nature of TDM communications comes the need for error detection and correction coding that increases efficiency beyond that obtained with established concatenated coding schemes.

A need has long existed in the industry for an improved error detection and correction coding structure for packet and burst transmission systems.

BRIEF SUMMARY OF THE INVENTION

One aspect of the present invention is a communication system that uses a product coded data packet in the data section of a discrete communication channel frame.

Another aspect of the invention is a communication system particularly adapted to efficient transmission of product coded Asynchronous Transfer Modem (ATM) cells.

A further characteristic of the present invention is an efficient transmission technique for packetized data using a product code adapted to a data section or data unit length.

A preferred embodiment of the present invention provides a communication subsystem for transmitting error correction coded data in packets. The communication subsystem comprises an input buffer storing unencoded data, a product coder coupled to the input buffer that accepts unencoded data from the input buffer and outputs product coded data packets having a packet size, and a time division transmitter transmitting the product coded data packets in a data section of a frame. The data section has a length substantially equal to an integer multiple of the packet size.

In one embodiment, the communication subsystem uses a $(60, 53) \times (63, 56)$ product coder and the integer multiple is 4. More generally, a $(s, t) \times (n, m)$ product code may be used with the product of t and m adapted to a data unit size. The parameter s is greater than t, and n is greater than m.

A preferred embodiment of the present invention is also found in a method for communicating error correction coded data in packets. The method includes storing unencoded data in an input buffer, product coding the unencoded data in the input buffer, and outputting product coded data packets having a packet size. The method also includes time division transmitting the coded data packets in a data section of a frame in which the data section length is substantially equal to an integer multiple of the packet size. As noted above, the integer multiple may be 4, as an example, and the data to be encoded may comprise ATM cells.

A novel time division multiplexed frame format for communicating error correction coded data is also disclosed. The frame format comprises a header section and a data section. The data section carries product coded data packets having a packet size and has a length substantially equal to an integer multiple of the packet size. As one example, the data section length may be 7560 QPSK symbols (15120 bits), and the data section may carry four $(60, 53) \times (63, 56)$ product coded data packets.

DETAILED DESCRIPTION OF THE INVENTION

Figure 1:
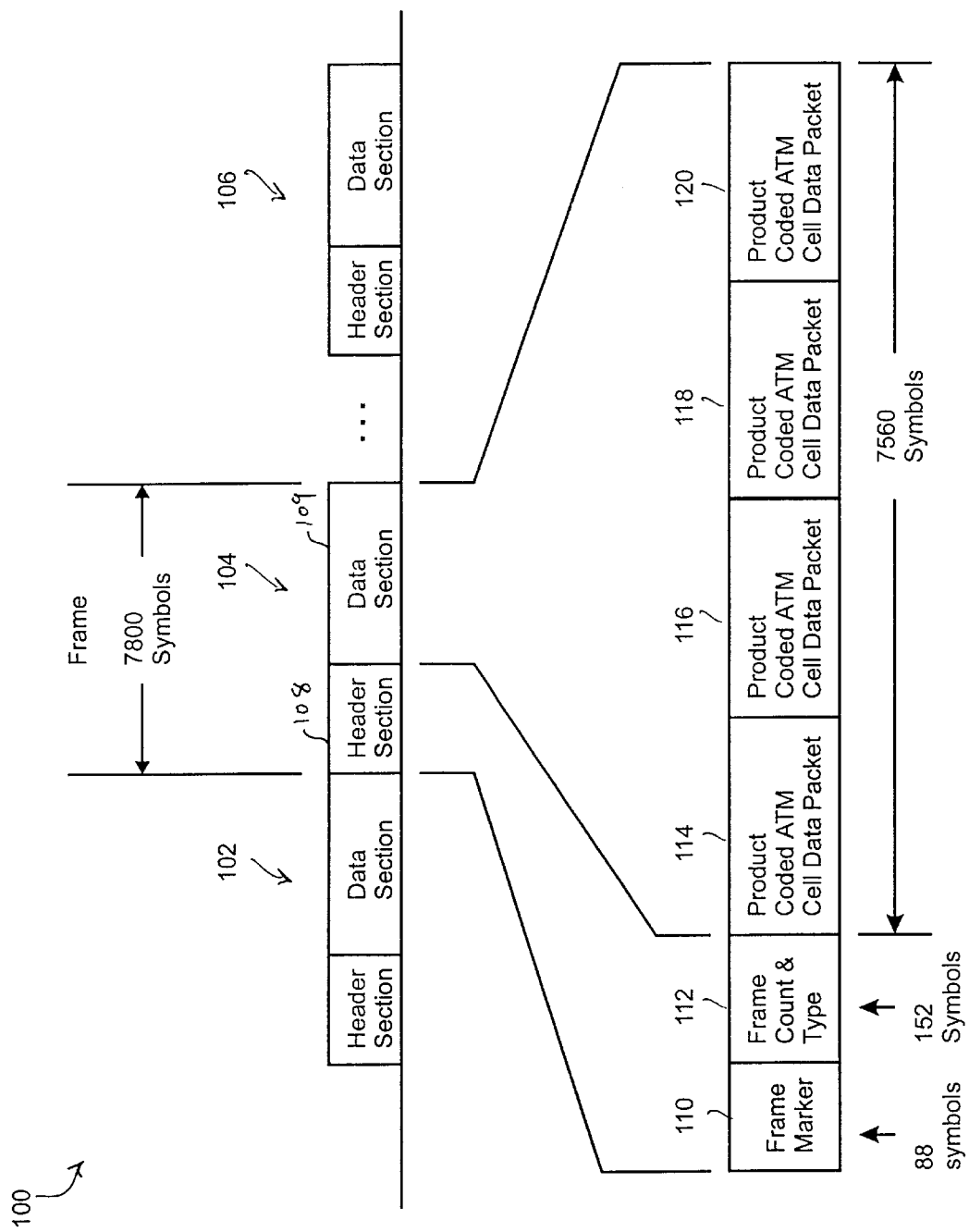
FIG. 1 illustrates a time division multiplexed frame structure.

Turning now to FIG. 1, that figure shows a time division multiplexed communications structure 100. The communications structure 100 is formed generally as a repeating series of frames (three of which are indicated as the frames 102, 104, and 106). FIG. 1 shows the structure of the frames, and the frame 104 specifically. The frame 104 includes a header section 108 and a data section 109. The header section 108 includes the frame marker 110 and frame count/type 112. The data section includes a series of product coded ATM cell data packets 114–120.

As an example, each frame may be 7800 symbols in length, divided into a header section 106 of 240 symbols and a data section of 7560 symbols. In the preferred embodiment, the symbols are Quadrature Phase Shift Keying (QPSK) symbols that provide two bits of data per symbol. Other modulation techniques, including various forms of PSK and GMSK, are also suitable, however.

The header section 108 generally includes such information as a frame marker sequence for delineation of frames, a non-repeating frame number, and a robust indicator of the coding type and structure used to product encode ATM cells. To this end, the header section 108 may use 88 symbols for the frame marker 110 and 152 symbols for the frame count and frame type 112. As noted above, the data section 109 includes 7560 symbols to carry data.

In the preferred embodiment, the data section carries an integer multiple number of product coded data packets. Thus, in FIG. 1, for example, the data packet size is 1890 symbols (3780 bits), and four data packets fit exactly into the data section 108. Because of the powerful error correcting and detecting nature of the product code, product coded data packets may be used instead of a conventional concatenated code. In other words, while a (236, 212). Reed Solomon outer code, rate–¾ convolutional inner code (i.e., a concatenated code) may also provide suitable error correction and detection, a concatenated code is less efficient and requires flush bits for the decoder. The flush bits are neither data nor parity bits, but are pure overhead and convey no useful information.

Using a product code to generate the data packets achieves excellent error correction capabilities without flush bits. In some systems, flush bits may occupy 8 or more symbols of the data section. The product coded packets thereby immediately increase throughput, and may also result in a reduction in transmitter power required to transmit the data section at a given BER.

An example of the increase in throughput may be understood using the specific example of 53 byte (424 bit) ATM cells (though any structured or unstructured data may be product coded). Using a (60, 53)×(63, 56) product code, each product coded data packet carries 53×56=2968 information bits (exactly seven ATM cells) and 812 parity bits (a total of 3780 bits or 1890 symbols). The 7560 symbol (15,120 bit) data section 108 thereby carries exactly four product coded data packets, or 28 ATM cells.

On the other hand, the concatenated coding scheme noted above only allows 24 ATM cells in the data section 109. This follows from the fact that the concatenated coding scheme uses 15104 bits to transmit 10,176 information bits (24 ATM cells), and further requires 8 symbols (16 bits) dedicated to flush bits in the data section. Product coded data packet transmission, tailored to the data section size, results in a 16% increase in throughput.

Figure 2:
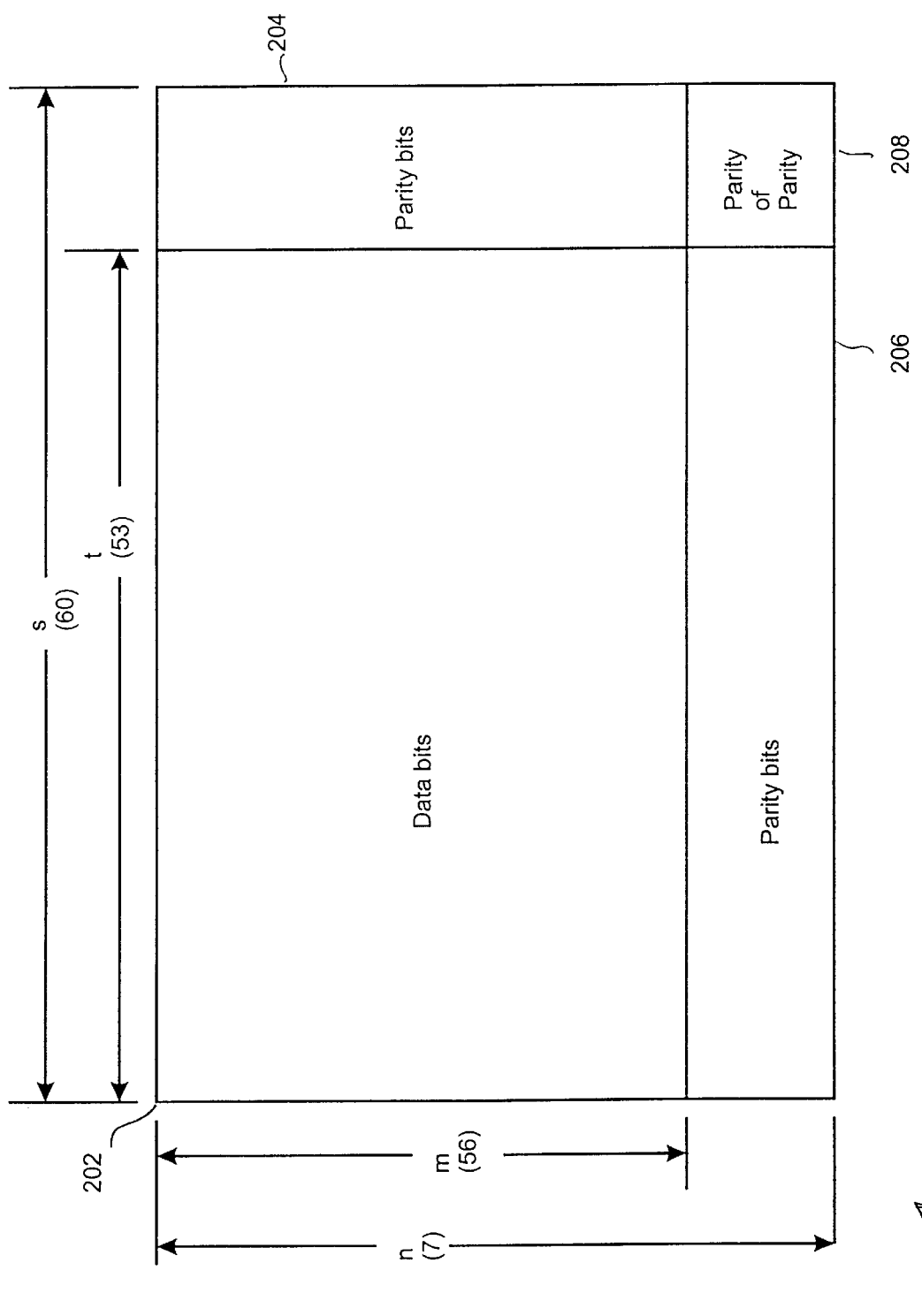
FIG. 2 shows a two dimensional product code adapted to code ATM cells.

Turning next to FIG. 2, that figure shows one embodiment of a two dimension product code 200 particularly adapted to transmitting ATM cells. The product code 200 includes a data bits section 202, a horizontal parity section 204, a vertical parity section 206, and a parity of parity section 208. The product code 200 is characterized as an (s, t)×(n, m) product code, where s>t and n>m.

Preferably, the product code is a (60, 53)×(63, 56) product code. The data bits section 202 then comprises 2968 bits, the horizontal parity section 204 comprises 392 bits, the vertical parity section 206 comprises 371 bits, and the parity of parity section 208 comprises 49 bits. As noted above, data bits section 202 may be used to carry exactly 7 ATM cells.

Iterative decoding may be used at the receiver to decode the product code 200. In other words, each row in the product code 200 may be decoded first, using the horizontal parity section 204. Each vertical column may then be decoded using the vertical parity section 206. The decoder may then repeat row and column decoding passing reliability information until a preselected number of iterations have been completed (e.g., 4, 16, or 32).

Figure 3:
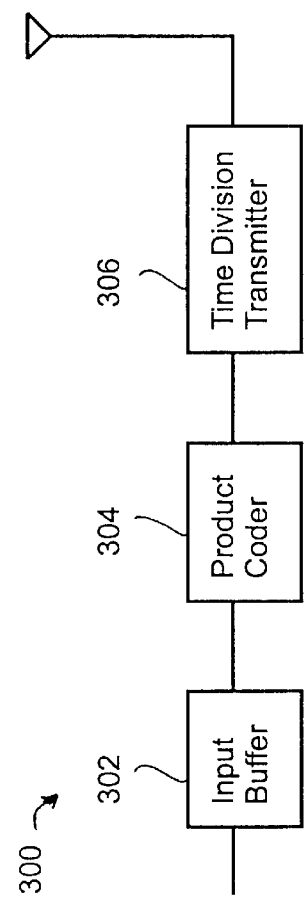
FIG. 3 shows a communication subsystem for transmitting error correction coded data in packets.

Turning next to FIG. 3, that figure shows a preferred embodiment of a communication subsystem 300 for transmitting error correction coded data in packets. The communication subsystem 300 includes an input buffer 302, a product coder 304, and a time division transmitter 306.

The input buffer 302 stores unencoded data (i.e., data that has not yet been coded by the product coder 304). As examples, the input buffer 302 may store ATM cells, unformatted data, or MPEG2 coded video. The unencoded data may arrive from virtually any source including terrestrial wireless and hardwired networks and satellite downlinks.

The product coder is coupled to the input buffer 302 and accepts unencoded data from which it produces product coded data packets. In a preferred embodiment, the product coder 304 operates on data units (i.e., a groups of related bits comprising, for example, TCP/IP packets, datagrams, or ATM cells) having a data unit size, and produces product coded data packets that carry an integer multiple of the data unit size. As an example, the product coder 304 may operate on ATM cell data units having a size of 53 bytes using a (60, 53)×(63, 56) product code to store seven ATM cells in a single product coded data packet. In general, the number of rows and columns in the product code may be varied to provide a data bit section 202 tailored substantially to the data unit size. Product coded data packets move to the time division transmitter 306 for transmitting.

The time division transmitter 306 accepts product coded data packets from the product coder 304. The time division transmitter prepares and transmits frames of information that include the product coded data packets. To this end, the time division transmitter may, for example, transmit a header section 108 followed by a data section 109 in an appropriate frame slot in a TDM or TDMA system. As shown in FIG. 1 and noted above, the data section preferably comprises an integer number of product coded data packets. Additional circuitry (not shown) such as a QPSK modulator, high power amplifier, and the like may form part of, or be coupled to the time division transmitter 306.

Figure 4:
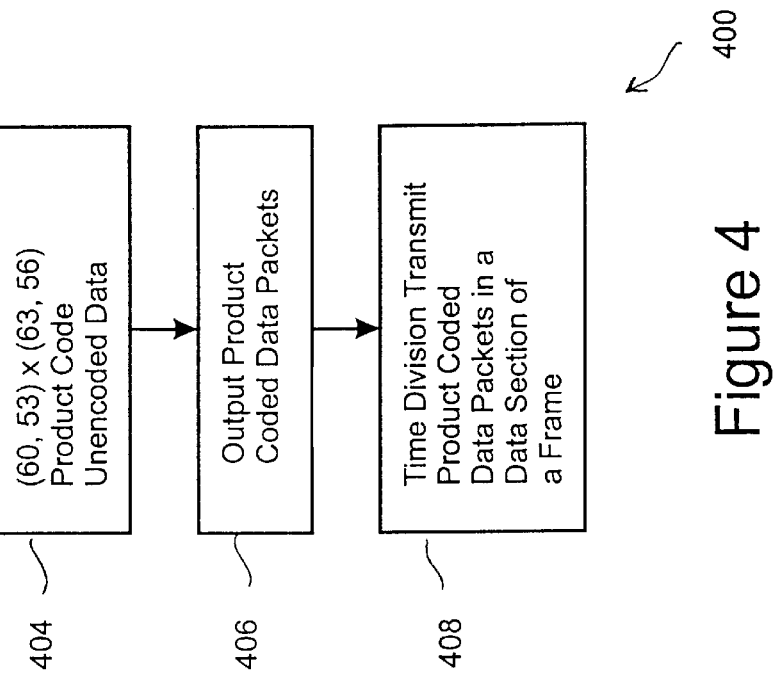
FIG. 4 depicts a method for efficiently communicating product coded data packets in frames.

Turning next to FIG. 4, that figure shows a flow diagram 400 for communicating error correction coded data in packets. At step 402, the communication subsystem 300, for example, stores unencoded data in a data buffer. Next, the product coder applies, preferably, a (60, 53)×(63, 56) product code to the unencoded data (step 404). The product coder subsequently outputs product coded data packets at step 406 in preparation for transmission. Transmission occurs at step 408, in which a time division transmitter transmits, preferably, an integer multiple of product coded data packets in a data section of a frame.

The present invention thereby provides a communication system that transmits product coded data packets efficiently in discrete communication channel frames. The communication system may be particularly adapted to transmission of product coded ATM cells, improving efficiency by 16% or more over conventional concatenated coding techniques. The present invention further provides a technique for transmitting data units using a product code specifically adapted to the data unit size for improved throughput and efficiency.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A communication subsystem for transmitting error correction coded data in packets, the communication subsystem comprising:
    an input buffer storing unencoded data;
    a product coder coupled to the input buffer, the product coder accepting unencoded data from the input buffer and outputting product coded data packets having a packet size, wherein said product coder encodes said unencoded data in a single coding operation using a plurality of simultaneously formed parity bit sections; and
    a time division transmitter transmitting the product coded data packets in a data section of a frame, the data section having a length substantially equal to an integer multiple of the packet size.

2. A communication subsystem for transmitting error correction coded data in packets, the communication subsystem comprising:
    an input buffer storing unencoded data;
    a product coder coupled to the input buffer, the product coder accepting unencoded data from the input buffer and outputting product coded data packets having a packet size, wherein the product coder is a (60, 53)×(63, 56) product coder, and
    a time division transmitter transmitting the product coded data packets in a data section of a frame, the data section having a length substantially equal to an integer multiple of packet size.

3. A communication subsystem according to claim 1, wherein the data section length is exactly equal to an integer multiple of the packet size.

4. A communication subsystem according to claim 3, wherein the input buffer stores ATM cells.

5. A communication subsystem according to claim 1, wherein the product coder is a two dimensional product coder.

6. A communication subsystem according to claim 1, wherein the product coder is an (s, t)×(n, m) product coder in which the product of t and m is an integer multiple of 424, the unencoded data comprises 53 byte ATM cells, s is greater than t, and n is greater than m.

7. A communication subsystem according to claim 1, wherein the product coder is an (s, t)×(n, m) product coder in which the product of t and m is an integer multiple of 424, the unencoded data comprises 53 byte ATM cells, s is greater than t, and n is greater than m.

8. A method for communicating error correction coded data in packets, the method comprising:
    storing unencoded data in an input buffer;
    product encoding the unencoded data in the input buffer and outputting product coded data packets having a packet size, wherein said unencoded data is product encoded in a single coding operation using a plurality of simultaneously formed parity bit sections; and
    time division transmitting the product coded data packets in a data section of a frame, the data section having a length substantially equal to an integer multiple of the packet size.

9. A method according to claim 8, wherein the step of transmitting comprises transmitting the coded data packets in a data section having a length exactly equal to an integer multiple of the packet size.

10. A method according to claim 9, wherein storing comprises storing ATM cells.

11. A method for communicating error correction coded data in packets, the method comprising:
    storing unencoded data in an input buffer;
    product coding the unencoded data in the input buffer and outputting product coded data packets having a packet size, wherein product coding comprises (60, 53)×(63, 56) product coding; and
    time division transmitting the product coded data packets in a data section of a frame, the data section having a length substantially equal to an integer multiple of the packet size.

12. A method according to claim 8, wherein the product coding step comprises product coding 53 byte ATM cells with a (s, t)×(n, m) product code in which s is greater than t, n is greater than m, and the product of t and m is an integer multiple of 424.

13. A method according to claim 8, wherein product coding comprises product coding data units having a data unit size with a (s, t)×(n, m) product code in which s is greater than t, n is greater than m, and the product of t and m is an integer multiple of the data unit size.

14. A time division multiplexed frame format for communicating error correction coded data, the frame format comprising:
    a header section; and
    a data section carrying product coded data packets having a packet size, the data section having a length substantially equal to an integer multiple of the packet size, wherein said product coded data is encoded in a single coding operation using a plurality of simultaneously formed parity bit sections.

15. A time division multiplexed frame format for communicating error correction coded data, the frame format comprising:
    a header section; and
    a data section carrying product coded data packets having a packet size, the data section having a length substantially equal to an integer multiple of the packet size, wherein the product coded data packets are (60, 53)×(63, 56) product coded data packets.

16. A frame format according to claim 14, wherein the data section length is exactly equal to an integer multiple of the packet size.

17. A frame format according to claim 14, wherein the product coded data packets comprise product coded ATM cells.

18. A frame format according to claim 14, wherein the product packets are two dimensionally coded product coded data packets.

19. A frame format according to claim 14, wherein the product packets are (s, t)×(n, m) product coded 53 byte ATM cells, s is greater than t, n is greater than m, and the product of t and m is an integer multiple of 424.

20. A frame Format according to claim 14, wherein the product packets are (s, t)×(n, m) product coded data units having a data unit size, s is greater than t, n is greater than m, and the product of t and m is an integer multiple of the data unit size.

* * * * *